United States Patent [19]

McGlashen

[11] 4,154,635
[45] May 15, 1979

[54] METHOD OF MAKING BALLS

[75] Inventor: James N. McGlashen, Winstanley, near Wigan, England

[73] Assignee: Dunlop Limited, England

[21] Appl. No.: 800,017

[22] Filed: May 24, 1977

Related U.S. Application Data

[63] Continuation-in-part of Ser. No. 585,667, Jun. 10, 1975, abandoned.

[30] Foreign Application Priority Data

Jun. 13, 1974 [GB] United Kingdom ............... 26341/74

[51] Int. Cl.² ...................... A63B 37/12; A63B 39/08
[52] U.S. Cl. .................................. 156/213; 273/58 A;
    273/58 B; 273/61 R; 273/61 C; 273/61 D
[58] Field of Search ............... 156/145, 147, 165, 213,
    156/214, 228, 229, 285, 297, 382; 273/58 A, 58
    B, 58 BA, 61 R, 61 C, 61 D

[56] References Cited

U.S. PATENT DOCUMENTS

| 1,415,438 | 5/1922 | Gibbons | 156/147 |
| 1,446,885 | 2/1923 | Gowin | 273/61 R |
| 2,299,544 | 10/1942 | Humphrey | 156/213 |
| 2,505,430 | 4/1950 | Roberts | 156/285 |
| 2,536,182 | 1/1951 | Humphrey | 156/285 |

FOREIGN PATENT DOCUMENTS

628103 8/1949 United Kingdom ................ 273/61 R

Primary Examiner—Caleb Weston
Attorney, Agent, or Firm—Stevens, Davis, Miller & Mosher

[57] ABSTRACT

A method and apparatus for adhesively applying cover pieces to a resilient tennis ball core. In one embodiment the exterior of the core is subjected to vacuum to expand the core while the covers, positioned in a flat orientation, are applied and adhesively secured with the vacuum then released. In another embodiment the cover pieces are cut undersize and longitudinally stretched immediately prior to their adhesive application.

4 Claims, 28 Drawing Figures

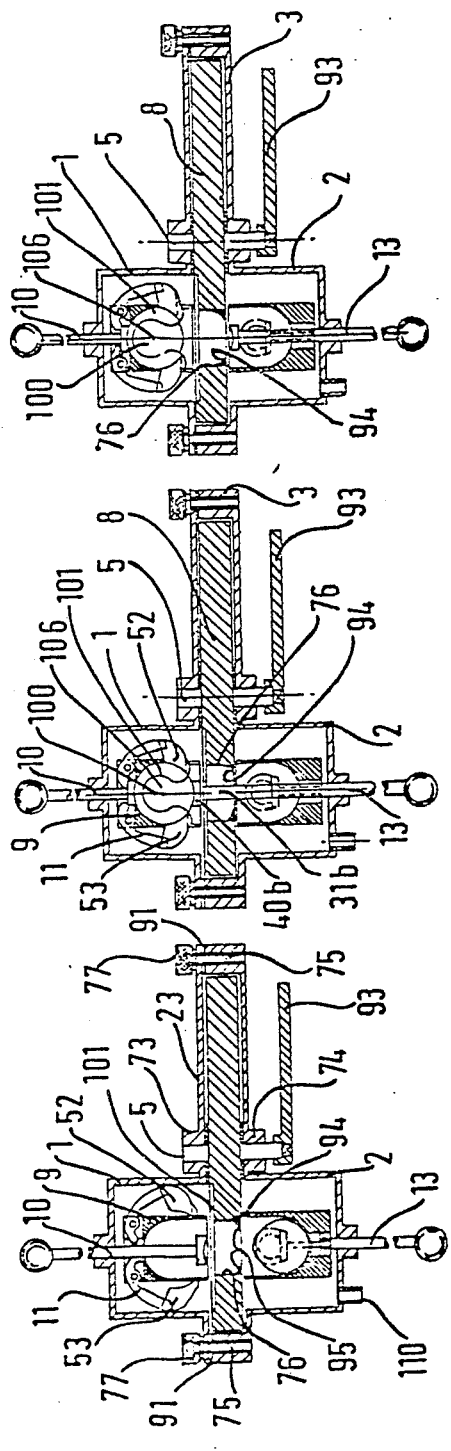

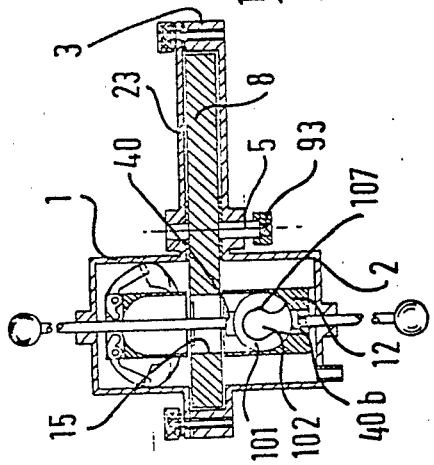
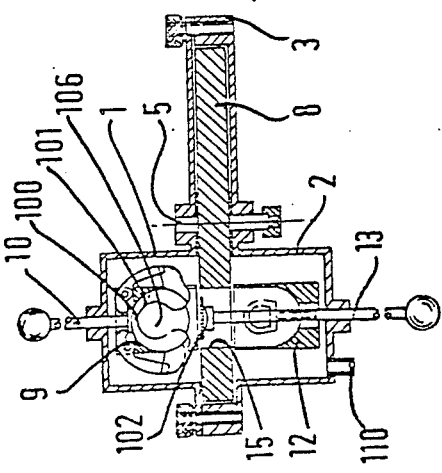

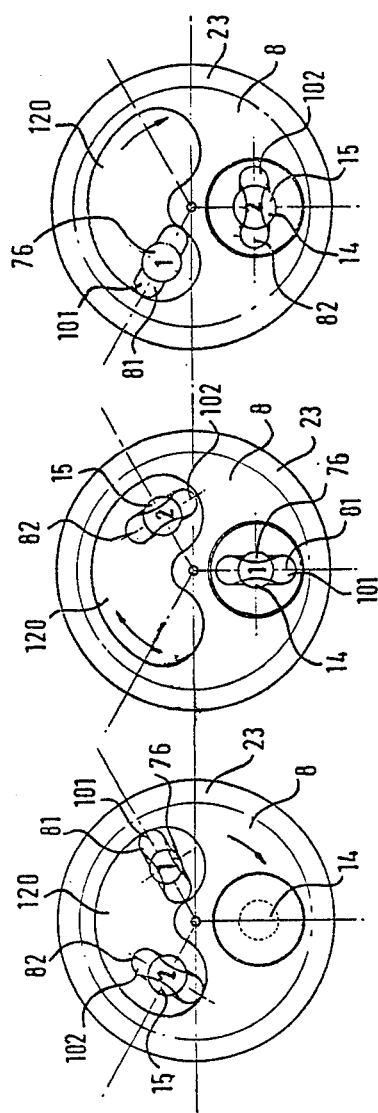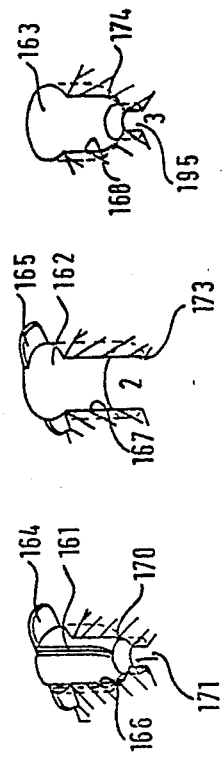

METHOD OF MAKING BALLS

This application is a continuation-in-part of application Ser. No. 585,667, filed June 10, 1975, abandoned.

This invention relates to improvements in or relating to the maufacture of balls, especially balls of the kind comprising a vulcanized rubber center or core having an outer layer of felt covering pieces, such as a tennis ball. More particularly the invention relates to the manufacture of tennis balls wherein two felt Cassinian-shaped cover pieces are wrapped in mutually perpendicular relation around a resilient core and adhesively secured to the core in edge-to-edge relation.

In the more commonly used techniques for manufacturing tennis balls a hollow, spherical, vulcanized rubber center or core is first produced, cured, coated with an adhesive, and subsequently covered by outer felt covering pieces which are positioned by first, a jig and then by hand to completely envelop the outer surface of the core. Before the felt covering pieces are applied to the core each covering piece is in the form of a strip of felt having a sticky adhesive coating on one side. The periphery of each cover is shaped like a figure eight, and the edges are coated with an adhesive.

When the felt covers are folded onto the core, care is to be taken to ensure that the edges of the felt covers do not overlap each other, while also ensuring that the gap between the edges of the felt covers is not too great. In both cases the finished ball will suffer from nonuniformity problems and will be rejected before packaging. It is important that the ball in its final form has a seam of uniform thickness between the felt pieces on the one hand to ensure uniformity of the ball and on the other hand to ensure that the ball does not have an unsightly appearance.

To position the felt covering pieces around a ball core requires a skillful and lengthy operation, and such an operation greatly increases the manufacturing cost of the ball.

In practice the felt cover pieces are folded around the ball core by first rolling one cover piece around the core on a jig, the second felt covering then being positioned by hand to fill the space not covered by the first felt piece, the pieces interlocking in the figure eight shape or Cassinian outline characteristic of such ball covers. Because the edges of each felt cover piece are coated with an adhesive cement, care has to be taken when fitting the second felt piece against the first felt piece to ensure that the edges do not contact each other before the second felt piece has been finally positioned on the outer surface of the ball. In cases where the felt pieces are applied mechanically, there is often a danger that when the second felt piece is folded onto the ball, either the edges of the respective pieces will abut each other before the second felt piece is positioned, thereby causing overlapping of the felt pieces, or that too great a gap will be left between adjacent felt pieces which will cause either overlapping of the pieces on the other side of the ball or wrinkling of the second felt piece.

The elimination of manual operations in the mass production of tennis balls presents great problems if the necessary high quality standards are to be attained. Previous proposals either require manual operations or produce a high proportion of defective balls and none is adapted to mass produce balls of high quality in a cost-effective manner.

One of the principal problems in the manufacture of tennis balls is to ensure that the felt cover pieces are accurately shaped when laid on the core since an enlargement of either of the two cover pieces will lead to the serious defect of overlapping whereas if either cover piece is too small the required edge-to-edge abutment of the two cover pieces will not be achieved. In view of the losse texture or composition of the felt cover pieces accurate shaping is difficult to ensure especially if they are stamped out in stacks of 5 or more, although it is economically more viable to cut the cover pieces in stacks rather than individually. If a number of cover pieces are cut in a single stamping operation, the compression of the felt layers will detract from the desired perpendicular edge of each cover piece and under the compressing and deforming force of the stamp, the cover pieces will tend to become progressively larger the lower they are in the stack.

On the other hand, cutting the cover pieces in stacks facilitates the application of adhesive to the peripheral edge of each cut cover piece since the adhesive is applied to the sides of the stack before the cover pieces are individually peeled off.

It is an object of the present invention to provide an improved method for applying a cover to a ball core.

It is a further object of this invention to provide an apparatus for applying a covering to a ball core.

According to another aspect of the present invention, a method for adhesively applying a cover to a resilient ball core comprises subjecting the exterior of the core to vacuum to expand the core, applying and adhesively securing the cover to the expanded core, and releasing the vacuum.

According to another aspect of the present invention, a method for applying adhesive cover pieces to a ball core comprises placing the ball core within a sealed chamber, subjecting said chamber to vacuum to expand the ball core, and applying one cover piece to the ball core in a first direction, mechanically folding the said cover piece around one half of the outer surface of the ball core, applying a second cover piece in a direction mutually perpendicular to the first cover piece and mechanically folding the second cover piece over the other half of the outer surface of the core such that the two cover pieces are secured to the outer surface of the ball core without the cover pieces being in abutting contact with each other, and subsequently releasing the vacuum thereby compressing the ball to allow the two cover pieces to come into abutting contact with one another.

A further object of the present invention is to permit the cover pieces to be cut in stacks of 5 or more while ensuring that each cover piece is of an exactly predetermined shape when applied to the ball core.

According to this further embodiment of the present invention, there is provided a method of making a ball comprising a core with discrete cover pieces of a stretchable material wrapped around and adhesively secured to the core in edge-to-edge relation, the method comprising initially cutting the cover pieces approximately to their intended shape but undersize, stretching the cover pieces within a template so that each is given a predetermined shape by the template and adhesively securing the cover pieces to the core while each substantially retains the shape to which it has been stretched in the template.

The method preferably comprises stretching felt cover pieces and adhesively securing them to a resilient core, and preferably two cover pieces are cut generally to a Cassinian-shape and after stretching are wrapped around the core so as to be perpendicularly related.

Each cover piece is preferably subjected to opposite stretching forces acting longitudinally of the end portions thereof, the central or waist portion of each cover piece not being subjected to transverse stretching forces. The central or waist portion of each cover piece may be restrained while its end portions are subjected to opposite longitudinal stretching forces whereby said central or waist portion is not subjected to longitudinal stretching forces.

After cutting to shape, but underize, the cover pieces required to cover a core are preferably placed flat in respective slots of a loading plate, each said slot constituting a said template, the cover pieces are stretched then while flat and in the respective slots to conform to the shape of the slots and the core is subsequently passed through the loading plate to carry the stretched cover pieces in sequence therewith into an enclosure whereby the cover pieces are wrapped around and adhered to the core.

While in the flat state, the generally Cassinian cover pieces are preferably stretched so as to have end edges with a smaller radius of curvature than the remainder of each end portion.

In accordance with another aspect of the invention, there is provided apparatus for carrying out the method described in the five preceding paragraphs, the apparatus comprising a loading plate having a generally Cassinian slot to receive an undersized cover piece in the flat state and means relatively movable toward and away from the slot to engage or release a cover piece in the slot, the stretching means comprising at least two members which are mutually separable in a direction parallel with the axis of the slot while in engagement with a cover piece therein longitudinally to stretch the cover piece.

The slot is preferably profiled so that when stretched to conform thereto, the cover piece has end edges of a smaller radius of curvature than the remainder of each end portion thereof.

Each of said members preferably has on its face presented to the slot an array of pointed projections to bite into a cover piece in the slot.

The stretching means preferably additionally comprises a stationary member interposed between said mutually separable members and arranged to clamp the central or waist portion of a cover piece in the slot while the end portions thereof are stretched by the separable members, and this has on its face presented toward the slot pointed projections to bite into a cover piece in the slot.

The stretching means preferably additionally comprises a perforated stripper plate arranged to overlie a cover piece in the slot and movable relative to said separable or said separable and stationary members whereby said pointed projections are movable through respective perforations of the stripper plate into and out of engagement with a cover piece in the slot.

A means is preferably provided biasing the stripper plate away from said members and for arresting it at a position spaced from and parallel therewith such that the pointed projections are retracted into the perforations, the arrangement being such that as the stretching means is advanced to the loading plate, the stripper plate contacts the loading plate and continued movement of the stretching means toward the loading plate causes the pointed projections to project through the perforations as the biasing means is overcome. The perforations of the stripper plate through which the pointed projections of said separable members are movable are preferably elongated in the direction of separating movement of said members.

A means is preferably provided for moving the loading plate so that two similar slots therein are advanced successively to a station where the stretching means is applied to a cover piece in the slot and to a station where a core is passed through the loading plate so as to carry the stretched cover piece in the slot with the core into an enclosure adjacent the loading plate, thereby wrapping the cover piece around and adhesively securing it to the core, and the arrangement of said two slots in the loading plate is preferably such that their axes are mutually perpendicular in the postions they occupy at both said stations and the stretching means may comprise four members which are mutually separable in perpendicularly related directions corresponding to said perpendicular axes.

A single stripper plate may be associated with all four said separable members.

Each said separable member is preferably guided for longitudinal movement in a respective channel and all of the separable members are preferably articulated to a common rotary member, the arrangement being such that angular movement of the rotary member imparts a similar reciprocating movement to the separable members in their respective channels.

The invention also provides apparatus for carrying out the methods described above.

The invention will now be described by way of example only with reference to the accompanying drawings in which:

FIGS. 2 to 7 are schematic cross-sectional views showing the apparatus in various stages of operation;

FIGS. 8 to 10 are plan views of one component of the apparatus;

FIGS. 12 to 14 are part-sectional perspective views of parts of the apparatus shown in FIG. 11;

Figure 1:
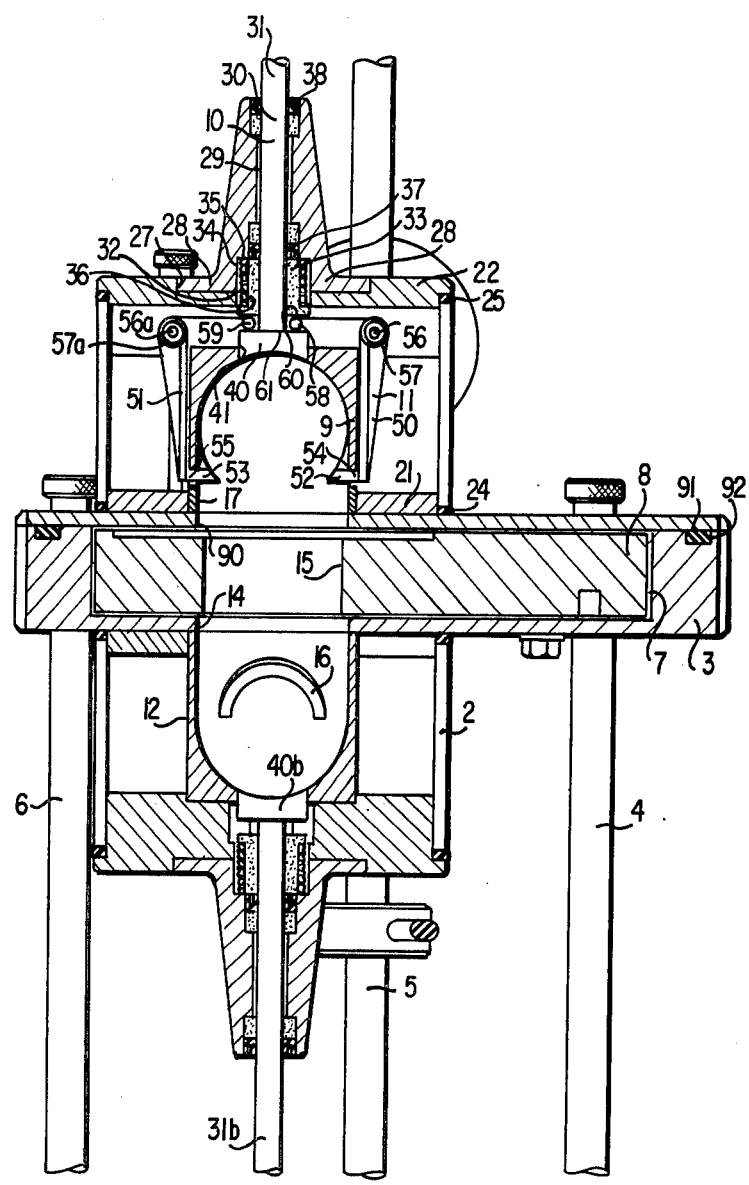
FIG. 1 is a cross-sectional view of one example of an apparatus for applying adhesive covers to a ball core.

In a first example, a test rig illustrating the principles of a machine for applying outer felt covering pieces to a vulcanized rubber center or core of a tennis ball comprises as shown in FIG. 1 two vertically disposed enclosure members 1 and 2, each enclosure member being positioned above and below a supporting table 3 respectively. The supporting table is supported by three legs, two of which 4 and 6 are shown on FIG. 1.

The supporting table 3 is provided with a circular recess 7 into which a circular loading plate 8 is located to be rotatable relative to the supporting table 3. The top enclosure member 1 incorporates a locating member 9 which is arranged to support a ball during various stages of the operation, a plunger means 10 for use in releasing the ball from the locating member 9, and a mechanical gripping means 11 utilized to assist in applying the felt covering pieces to the ball core.

The bottom enclosure member 2 is similarly provided with a locating member 12, plunger means 13 and mechanical gripping means 16.

The enclosure members 1 and 2 are arranged to be secured to the table 3 such that the locating members 9 and 12 can be positioned coaxially and joining one another with the supporting table and loading plate positioned there between. Circular throughways 14 and 15 are provided to extend through the cross section of the base of the table and loading plate as shown in FIG. 1 such that a ball may be displaced from the top enclosure member 1 through said apertures 14 and 15 to the bottom enclosure member 2.

The enclosure members 1 and 2 are connected to a vacuum pump (not shown) so that the air within the enclosure members may be evacuated to provide a vacuum within said members.

The construction of both enclosure members 1 and 2 is substantially the same, and therefore only the top enclosure member 1 will be described in detail. The top enclosure member 1 comprises a cylindrical glass wall portion 20 having circular flange members 21 and 22 positioned at each end thereof. The flange member 21 is of similar diameter to the interior diameter of the cylindrical wall portion 20 and is arranged to rest on a plate 23 which constitutes a top plate secured to the top of the table 3. An O-ring seal 24 is positioned between the end of the wall portion 20 and the plate 23 to ensure an airtight seal between the chamber enclosed by the enclosure member 1 and the surroundings. The flange member 22 is arranged to rest on the opposite end of the wall portion 20 about an annular shoulder portion 25 furnished on the flange 22. An O-ring 26 is positioned between the end of the wall portion 20 and the annular shoulder 25 to seal the chamber defined within the enclosure member 1 from the surroundings.

A recessed portion 27 of circular cross section is provided in the outer face of the flange 22 and is arranged to accommodate a similarly shaped flange 28 provided at one end of the frusto-conical boss 29. The boss 29 is secured to the flange 22 by means (not shown) and is provided with an axially extending throughway 30 which accommodates a piston rod 31 comprising part of the plunger means 10. The piston rod 31 is also arranged to extend through an aperture 32 provided within the center of the enclosure member flange 22. The end of the throughway 30 adjacent the flange 28 of the boss 29 is arranged to be of larger diameter than the rest of the throughway in order to accommodate a cylindrical thrust bush 33 which fits coaxially around the piston rod 31 and also coaxially supports a compression spring 34 the ends of which engage a shoulder 35 furnished within the throughway 30 and a shoulder 36 provided at one end of the bush 33 respectively. Two axially spaced lip seals 37 and 38 are located within the throughway 30 to abut the piston rod 31 to prevent leakage of air into the enclosure member 1.

The end of the piston rod 31 which extends into the enclosure member 1 is connected to a piston 40 which is arranged to extend through an aperture 41 provided in one end of the locating member 9. The outer surface of the locating member 9 is of a circular cross section having a diameter substantially the same as the diameter of a centrally positioned aperture 17 provided in the end flange 21 of the enclosure member 1, such that the locating member 9 is a close fit within said aperture. The inner surface of the locating member is hemispherically formed with the end providing the aperture 41 being at the closed end of the half sphere. The surface of the piston 40 which extends within the aperture 41 is shaped to complete the spherical profile of the inner surface of the locating member.

The mechanical gripping means 11 comprises two bell cranks 50 and 51 positioned one on each side of the locating member 9, one end of each bell crank is connected to a consolidating member 52 or 53 respectively, the consolidating members being arranged to extend respectively through slots 54 and 55 provided one in each side of the locating member 9. Each bell crank 50 or 51 is pivotally supported about a hinge pin 56, 56a and 57, 57a. The opposite ends 58 and 59 of the bell cranks are consolidating members 52 and 53 which are attached to the bell cranks 50 and 51 and are arranged to locate within a recess 60 formed by the inwardly facing surface of the thrust bush 33 and the outwardly facing surface 61 of the piston 40. (The terms inwardly and outwardly as used in this context are used in respect of the mid-panle of the apparatus, i.e., of the supporting table 3). The portions of the members 52 and 53 which extend within the locating member 9 are shaped to conform with the spherical profile of the inner surface of the locating member.

The operation of the gripping means 11 is such that when the piston 40 and piston rod 31 are displaced vertically downwards from the position as shown in FIG. 1 (i.e., towards the supporting table 3), the ends 58 and 59 of the bell cranks 50 and 51 are held within the recess 60 defined between the piston 40 and the thrust bush 33 and are displaced with the piston and piston rod by the bush 33 as the spring means expands from the position as shown in FIG. 1. The displacement of the ends 58 and 59 of the bell cranks 50 and 51 causes the bell cranks to pivot about their respective hinges 56, 56a thereby causing the consolidating members 52 and 53 to be displaced away from the locating member 9 via the slots 54 and 55.

The bottom enclosure member 2 is substantially the same as the top enclosure member 1 described above, except that the gripping means 16 of the enclosure member 2 is disposed at 90° to the gripping means 11 of the enclosure member 1. The disposition of the gripping means of the two enclosure members ensures that when the ball core is passed from one enclosure member to the other the gripping means will alternately engage the diametrically opposed halves of the ball.

As previously described the supporting table 3 comprises a circular body portion furnished with a centrally positioned circular recess 7 into which is located the circular loading plate 8. The circular loading plate is pivotally mounted about its center about an axially extending shaft 5 which is arranged to extend in a non-rotatable fashion through the loading plate 8 and to be rotatably located within bosses 73 and 74 positioned one on the top plate 23, and the other on the base of the supporting table 3 (shown in FIGS. 2 to 7). The loading plate 8 is provided with two axially extending throughways 15 and 76 (the throughway 76 is not shown in FIG. 1 but is shown in FIGS. 2 to 4 and 8 to 10). The two throughways 15 and 76 are offset from the center of the loading plate 8 and are positioned on a common pitch circle drawn from the center of said plate, such that on rotation of the plate 8 the throughways 15 and 76 in turn coaxially pass over the aperture 14 which is provided in the base of the supporting table 3.

The upper surface (as viewed in FIGS. 8 to 10) of the loading plate 8 is provided with two milled slots 81 and 82, each of which is profiled to accommodate a felt covering piece. The center of each slot is enlarged by a circular aperture which constitutes the throughways 76 or 15. The throughway 15 is arranged to be of greater diameter than the throughway 76 for the purpose which will be later described.

The supporting table 3 and loading plate 8 are covered by the circular top plate 23 having a diameter the same as that of the supporting table and being provided with a circular throughway 90 (FIG. 1) which is positioned coaxially over the aperture 14 provided in the base of the support table and therefore is coaxially over the path of the throughways 15 and 76 of the loading plate 8 as the loading plate rotates. The top plate 23 is secured to the supporting table 3 by bolts 77 (shown in FIGS. 2 to 7) which are arranged to screw into threaded apertures 75 provided with table 3, and is held in sealed engagement with the supporting table 3 by means of an annular O-ring 91 which locates within an annular groove 92 provided in the top face of the supporting table 3. The top plate 23 is also provided with a kidney-shaped aperture 120 (shown in FIGS. 8 to 10). The aperture is positioned away from the circular aperture 90, i.e., away from the enclosure members 1 and 2 and is arranged to be covered in a sealed manner by a cover member (not shown). The axially extending mounting shaft 5 is arranged to extend coaxially above and below the table 3 parallel to the axis of the enclosure members 1 and 2. The shaft also coaxially supports a lever 93 (FIG. 2) such that on displacement of the lever 93 the plate 8 is axially rotated within the recess 7 relative to the table 3.

As shown in FIG. 2 the base of the throughway 76 of the loading plate 8 is provided with an annular ledge 94 which reduces the diameter of the throughway such that a ball core is prevented from passing therethrough but the pistons of the plunger means are not impeded. The ledge 94 is furnished with an upper arcuate surface 95, profiled to support the ball core. The thickness of the loading plate 8 is arranged to be slightly greater than the diameter of the ball core such that a core may be positioned in the throughway 76 to rest on the annular ledge 94 without the other side of the ball protruding vertically above the upper surface of the plate 8.

The operation of the apparatus is shown in FIGS. 2-10 and comprises the following sequence of events.

The cover portion (not shown) is removed from the top plate 23 to expose the kidney-shaped aperture 120 (FIGS. 8 to 10), a ball core 100 is positioned in the throughway 76 of the loading plate 8 to locate against the ledge 94 as previously described. As shown in FIG. 8 a felt covering piece 101 is positioned in the slot 81 provided in the top surface of the loading plate 8 with the adhesively coated side lying facing the base of the apparatus and the felt side facing towards the enclosure means 1. An additional felt piece 102 is located within the other slot 82 with the adhesively coated side facing upwardly and the felt side facing towards the second enclosure member 2, i.e., upside down with respect to the first felt piece 101. The loading plate 8 is rotated by means of the handle 93 via the axially extending shaft 5 such that the throughway 76 is in the position as shown in FIGS. 2 and 9, that is with the first felt piece 101 and core ball 100 positioned between the enclosure members 1 and 2.

Because the two enclosure members 1 and 2 as previously described are substantially identical, the components of the enclosure member 2 (bottom enclosure member) will be designated by the same reference numerals as the reference numerals used for the upper enclosure member 1, except that the prefix b will be used for the components of the bottom enclosure member. When the ball core 100 has been positioned between the enclosure members 1 and 2 (FIG. 9), the space enclosed within the enclosure members is evacuated by a vacuum pump (not shown) via an outlet port 110 provided in the base of the enclosure member 2 (FIG. 2). The enclosure members are evacuated to a vacuum pressure of 24 inches of mercury. Evacuation of the air space surrounding the ball core causes the core to expand for a purpose which is disclosed later in the specification.

The plunger means 13 of the bottom enclosure member 2 is displaced vertically upwards so that the piston 40b first abuts the base of the core 100, and second on subsequent displacement of the piston rod 31b, the piston 40b pushes the core 100 from the throughway 76 of the loading plate 8 against the adhesively coated surface of the felt cover piece 101 and into the locating member 9 of the upper enclosure member 1. As the core 100 is displaced into the locating member 9 of the enclosure member 1 the plunger means 10 of the upper enclosure member is displaced vertically from the position as shown in FIG. 2 until it assumes a position as shown in FIG. 3. Displacement of the core 100 also causes the cover piece 101 to be wrapped around the core 100, first by the spherical form of the inner surface of the locating member 9 and second by the consolidating members 52 and 53 of the mechanical gripping means 11. As the plunger means 10 is displaced vertically the consolidating members 52 and 53 are displaced towards the entrance of the locating member via the bell cranks 50 and 51 which pivot about the hinges 56 and 56a. As the ball core is pushed firmly into the locating member 9 by the piston 40b via the piston rod 31b of the lower enclosure member 2, the cover piece 101 is firmly located against the outer periphery of the core 100 as shown in FIG. 3. The plunger means 13 is subsequently withdrawn to assume the position as shown in FIG. 4.

The loading plate 8 is rotated through 120° by the lever 93 via the mounting shaft 5 to assume the position as shown in FIGS. 5 to 7 and 10. With the loading plate 8 in this position relative to the enclosure members 1 and 2, the second cover piece 102 is positioned vertically below the ball core 100 which is gripped by the consolidating members 52 and 53 and is located within the locating member 8 of the enclosure member 1. The longitudinal axis of the second felt piece 102 is arranged to be at 90° to the longitudinal axis of the first felt piece 101 (illustrated in FIGS. 8 to 10) and is arranged such that when the first felt piece 101 is applied to the ball core 100 as shown in FIG. 3, a space 106 defined by one half of the outer surface of the ball core is left uncovered, the other half of the ball core being covered by the first felt member 101. The plunger means 10 of the upper enclosure member 1 is displaced vertically downwards thereby forcing the consolidating members 52 and 53 to be pivoted via the hinges 56 and 56a away from the locating member 9 and allowing the ball core 100 to be displaced vertically down from the locating member 9 onto the adhesively coated surface of the second covering piece 102, through the second throughway 15 of the loading plate 8 and into the locating member 12 of the bottom enclosure member 2. Because the first covering piece 101 has been already positioned on the ball core 100, the diameter of the ball core plus felt piece 101 is greater than the original diameter of the ball core and therefore the throughway 15 in the loading plate 8 has to be of greater diameter than the throughway 76.

As the ball core 100 is pushed into the locating member 12 of the bottom enclosure member 2, the second covering piece 102 is folded around the uncovered portion 106 of the ball core 100 by the spherical profile of the inner surface of the locating member 12 and by the action of the consolidating members of the mechanical gripping means 16. The consolidating members are displaced towards the ball core and are arranged to push the edges of the covering piece 102 against the outer surface of the core 100 until the ball core assumes the appearance as shown in FIG. 6.

To ensure an accurate angular relationship between the ball core and the covering pieces it is important that displacement of the plunger means will not cause rotation of the ball core relative to the loading plate. For this purpose each of the piston rods 31 and 31b of the plunger means 10 and 13 is coupled by a forked member (not shown) to the vertically extending mounting shaft 5, so that the piston rods 31 and 31b are displaceable parallel to the shaft 5 but are not rotatable relative to the shaft 5.

As shown in FIG. 6 the ball core 100 is located within the locating member 12 of the enclosure means 2 with the pistons 40 and 40b of the enclosure members 1 and 2 respectively abutting opposite sides of the ball, and with the felt covering pieces 101 and 102 covering virtually the whole of the outer periphery of the ball. A gap 107 is provided between the edges of the felt pieces 101 and 102 defining a Cassinian outline characteristic as viewed in FIG. 6. The edges of each of the covering pieces 101 and 102 are previously coated with a contact adhesive and as previously described it is important that when the covering pieces are applied to the ball core the edge of one piece does not abut the adjacent edge of the other cover piece before the covering pieces have been finally positioned on the core 100. By subjecting the enclosure members 1 and 2 to a vacuum the diameter of the ball core is expanded due to the pressure of the air within the ball core being greater than the surroundings. The expansion of the ball core means that the cover pieces 101 and 102 do not quite cover the whole outer surface of the ball core and therefore the gap 107 is formed between the edges of the cover pieces.

When the vacuum pressure is released via the port 110 provided in the bottom enclosure member 2 as shown in FIG. 7, the ball contracts, thereby reducing the gap 107 defined between adjacent edges of the cover pieces so that the adjacent edges of the cover pieces come into abutting contact with each other and are adhesively secured together.

The ball with the cover pieces located on its outer surface may be subsequently displaced from the locating member 12 of the bottom enclosure member 2 by the plunger means 13 vertically upwards into the throughway 15 provided within the loading plate 8. On rotation of the plate 8 by the lever 93 the ball may be displaced away from the enclosure members 1 and 2 to a position vertically below the unloading cover (not shown), the cover may be removed and the covered ball removed from the apparatus.

Figure 11:
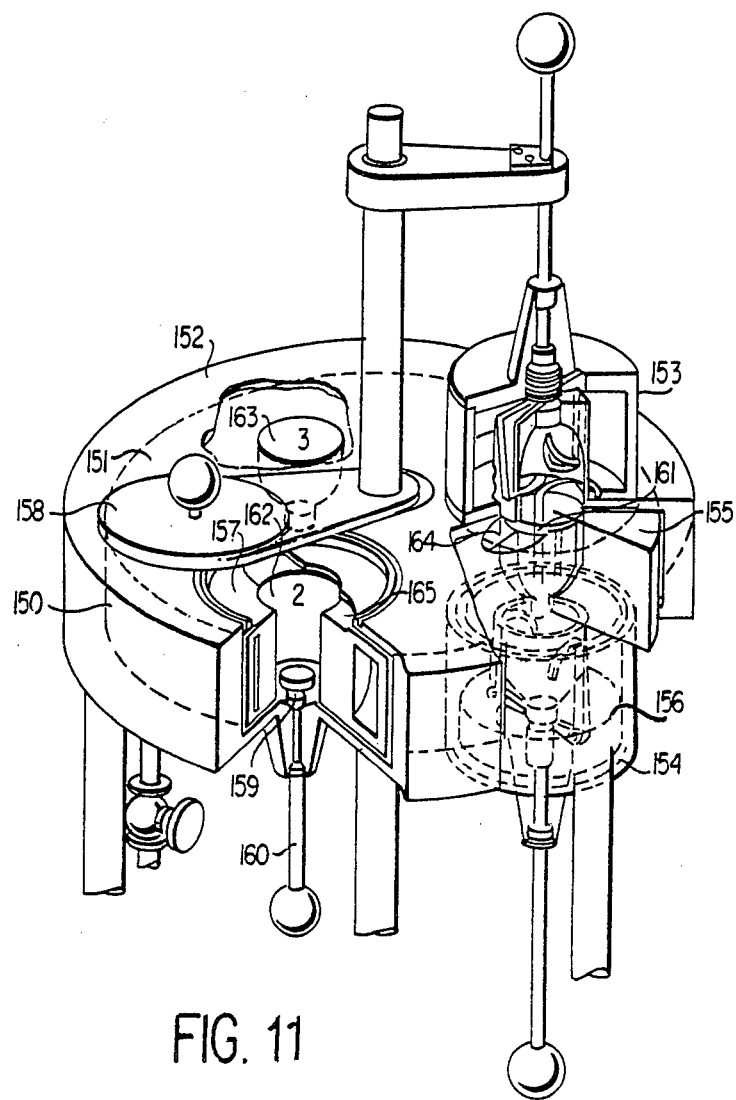
FIG. 11 is a part-sectional perspective view of a further example of an apparatus for applying adhesive covers to a ball core.

In a further example of a test rig shown in FIG. 11, for applying felt covering pieces to a resilient tennis ball core, a loading plate 150 is positioned within an enclosure between upper and lower plates 151 and 152 to be axially rotatable therein in a manner similar to the previously described construction. Upper and lower enclosure chambers 153 and 154 are positioned coaxially above and below the loading plate 150 and throughways 155 and 156 are provided in the upper and lower plates respectively to interconnect the upper and lower chambers. The enclosure chambers are arranged to be subjected to a vacuum in the same manner as previously described.

A loading/unloading station is provided on a common pitch circle with the chambers and this station includes a circular aperture 157 provided in the top plate 151 covered by a swivelling sealed cover member 158. An aperture 159 is provided in the lower plate 152 through which a plunger means 160 is arranged to be displaced vertically to engage a finished ball to eject the ball from the loading plate 150 through the aperture 157 in the top plate. The ejection plunger 160 is similar to the plungers previously described except that there is no means to engage the sides of the ball.

The loading plate 150, instead of having two apertures 15 and 76 as shown in FIGS. 8 to 10, is provided with three apertures 161, 162, and 163 equally spaced at 120° from each other on a common pitch circle; two of the apertures 161 and 162 are provided with recesses (slots) 164 and 165 similar to the slots 81 and 82 shown in FIGS. 8 to 10, and the third aperture 163 is of circular cross section and has no slot. Each aperture is arranged to serve as an entry into one of three cavities 166, 167, and 168 provided within the body of the loading plate 150 and shown in FIGS. 12, 13, and 14. The cavities are arranged to be of sufficient depth to hold a tennis ball so that the ball does not protrude above the upper and lower surfaces of the loading plate. The first cavity 166 (FIG. 12) is provided with a hemispherical bottom portion 170 with a hole 171 in the base of said portion to allow the passage of a push rod. The hemispherical bottom portion 170 prevents the ball from being displaced through the cavity 166. The second cavity 167 (FIG. 13) is of a circular cross section which corresponds to the exterior of a tennis ball but is provided with a large aperture 173 within its base which allows the ball to pass through the cavity. The third cavity 168 (FIG. 14) is provided with a hemispherical bottom portion 174 and a small aperture 195 substantially similar to the first cavity. The diameter of the entry aperture 161 of the first cavity 166 is arranged to be the same as the diameter of the ball core when expanded, while the diameter of the entry apertures 162 and 163 of the second and third cavities 167 and 168 are arranged to be of the diameter of the expanded core plus the thickness of two felt covering pieces.

The enclosure chambers 153 and 154 are substantially the same as the chambers described in the previous example and will not be described in detail.

The sequence of operation using this modified rig is slightly different to the previously described operation and is illustrated with reference to FIGS. 15 to 20 which are schematic views of the upper and lower plates 151 and 152 and locating plate 150 in various positions relative to the enclosure members. The views are shown in exploded form to highlight the detail of the operation.

Figure 15:
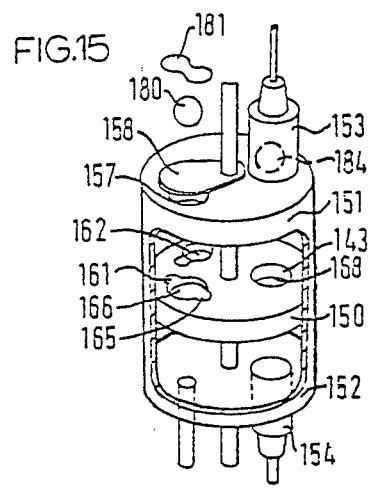
FIGS. 15 to 20 are exploded views of parts of the apparatus of FIG. 11 shown in various stages of operation.
Figure 16:
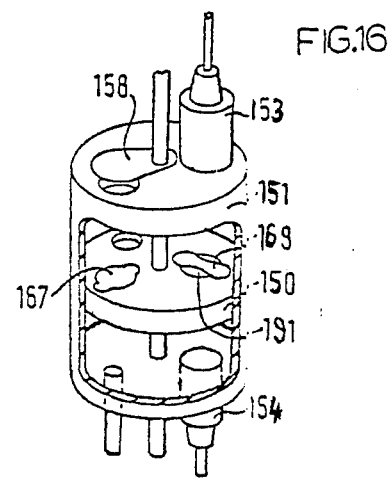

FIG. 15 shows the assembly at the start of the cycle with a completed tennis ball 184 in the upper enclosure member 153 and the first cavity 166 positioned directly underneath the aperture 157 in the upper plate 151 with the sealed cover 158 displaced away from the aperture 157. A ball core 180 is positioned within the cavity 166 in the loading plate 150 and a first felt 181 covering piece is positioned within the associated slot 165 with the adhesive face facing towards the ball core. While the core and first felt is being loaded at the loading station the plunger on the upper enclosure chamber 153 is actuated to push the completed ball 184 from the upper chamber into the third cavity 168 in the loading plate 150. The plate is subsequently rotated through 120° to bring the first cavity 166 directly underneath the enclosure chambers as shown in FIG. 16. The second cavity 167 is then positioned at the loading stage. The push rod associated with the upper enclosure member 153 is then displaced downwardly until the push rod engages the core located in the first cavity 166 in the loading plate 150.

Figure 17:
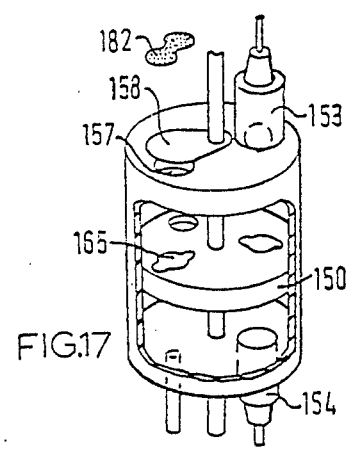

As shown in FIG. 17 a second felt 182 is then positioned with the slot 165 associated with the second cavity 167 with the adhesive face of the felt facing upwardly towards the upper plate 151. The sealed cover 158 is then positioned over the aperture 157 in the top plate to seal the assembly. The vacuum is then applied to expand the core. The push rod associated with the lower enclosure chamber 154 is then displaced upwardly until it engages the lower face of the ball core 180; both push rods are then displaced upwardly forcing the ball and first felt into the upper enclosure member 153 and into engagement with the gripping arms and thereby forming the felt round one half of the periphery of the ball as described previously. The lower push rod is then fully retracted until it is within the lower enclosure chamber 154.

Figure 18:
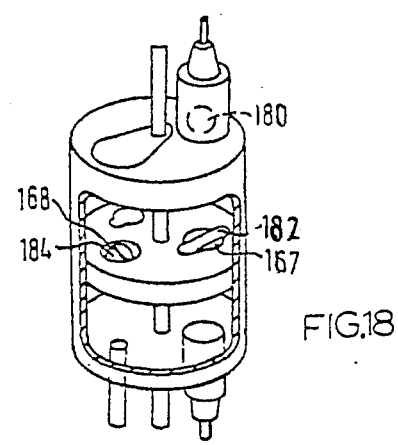
Figure 19:
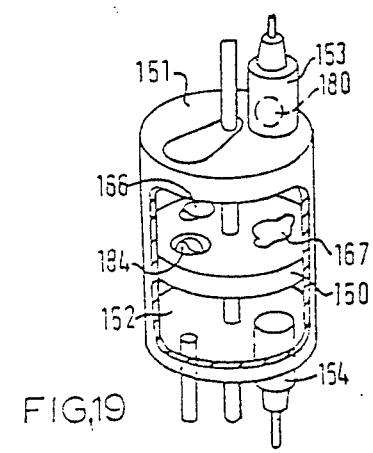

The loading plate 150 is subsequently indexed through a further 120° so that the second cavity 167 and the second felt covering piece 182 is positioned underneath the enclosure members (FIG. 18). The third cavity 168 containing the completed ball 184 is positioned underneath the loading station. The lower push rod is displaced upwardly to engage the non-adhesively coated face of the second felt 182 and to transfer the second felt to the adjacent face of the ball core 180 which is located in the upper enclosure member 153. When the lower push rod and felt engage the ball core, both push rods then descend with the core plus the two felts 181 and 182 (the first felt having already been formed on the ball), transferring the ball and felts through the loading plate 150 and second cavity 167 to the bottom enclosure chamber 154 where the second felt 182 is formed round the ball and the ball is held by the lower gripping members. The felt is applied to the ball substantially as described earlier in the specification. The ball is now located in the lower enclosure member 154 with both felts applied, it is then transferred through the loading plate 150 and back to the top enclosure chamber 153 where it is gripped by the gripping members as shown in FIG. 19, the lower push rod is subsequently fully retracted back to the lower enclosure chamber 154.

Figure 20:
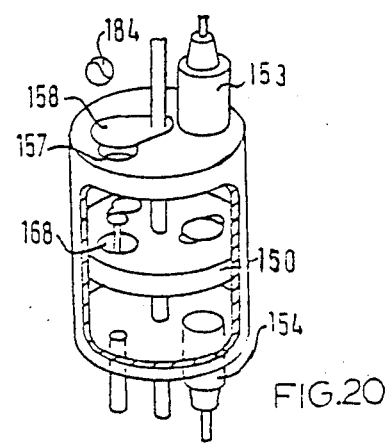

The vacuum is then released and the sealing cover 158 removed from the aperture 157 in the upper plate (FIG. 20). It will be noticed that the completed ball 184 that was originally in the upper enclosure member 153 at the start of the cycle (FIG. 1) is now in the third cavity 168 and the push rod associated with the lower plate directly underneath the cavity 168 may be activated to push the ball clear of the loading plate 150 and eject the ball through the aperture 157 in the upper plate. The loading plate 150 is then indexed through a further 120° to bring the first cavity 166 directly underneath the loading station as shown in FIG. 15.

It will be noticed that after one revolution a completed ball is located in the upper enclosure member (FIG. 19) and that the assembly has completed one full cycle. In other words, from the stage when a core is positioned in the loading plate to the stage where the completed ball is ejected from the loading plate, the loading plate goes through one and two thirds revolutions, the ball is formed after two thirds of a revolution but is located in the top chamber and then during the next revolution when another ball is being loaded, the completed ball is transferred from the upper enclosure member to the third cavity and eventually to the loading station where it is ejected.

Figure 21:
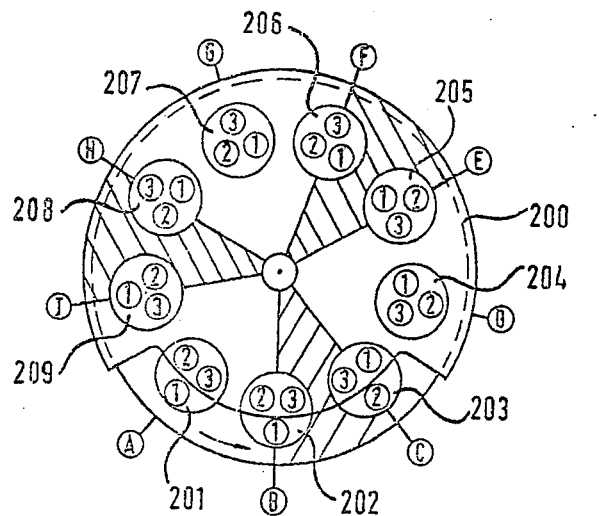
FIG. 21 is a schematic view of part of a still further example of an apparatus for applying adhesive covers to a ball core.
Figure 22:
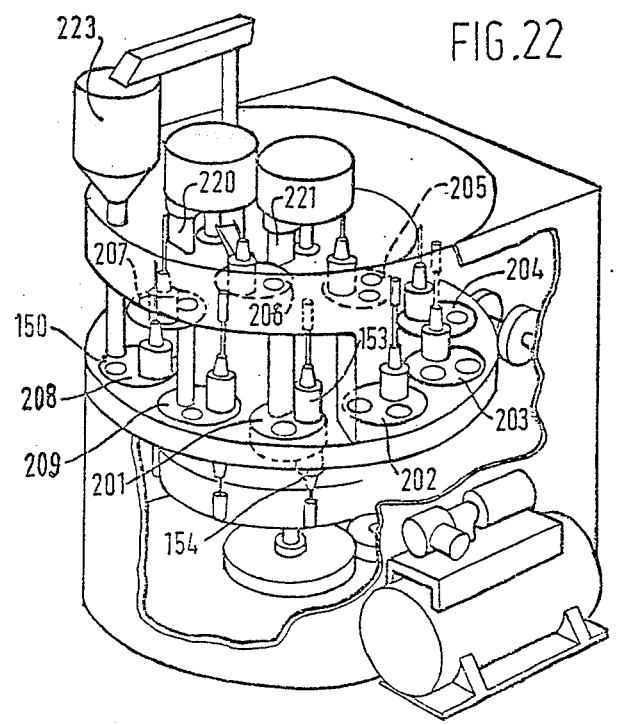
FIG. 22 is a perspective view of the apparatus, part of which is shown in FIG. 21.

A rig of the kind described above is ideally suited for implementation into a machine for automatically applying felt covering pieces to tennis ball cores and the basis of one such machine is shown in FIG. 22 with the details of operation illustrated in FIG. 21.

In essence, the machine comprises a rotatable head 200 which contains nine assemblies 201–209 of the kind illustrated in FIGS. 14 to 20, equally spaced around a common circle about the rotational axis of the head assembly. Each of the ball covering assemblies is arranged to have a loading plate 150 of the kind described above which is axially rotatable within each cell and is provided with an upper 153 and lower 154 enclosure member shown in FIG. 22. The head assembly is also axially rotatable and is arranged to index through 40° in an anticlockwise direction as viewed in FIG. 21 to define nine stations lettered A to J. The loading plate 150 of each cell is arranged to be indexed at 120° as previously described.

The sequence of operation is as follows. At station A a ball core is loaded into cavity 1 of the loading plate and the head is indexed through 40° to station B where the first felt is applied to cavity 1. As the head assembly is indexed between stations B and C, the loading plate is rotated through 120°, and at C a second felt is applied to cavity 2. At station D, the sealed cover member 158 is positioned over the loading plate and the vacuum is applied causing the ball core to expand. At station E the first felt is applied to the ball core in cavity 1 and the ball core is retained in the upper enclosure chamber. Between stations E and F the loading plate rotates through 120° so that the second felt can be presented to the ball core which is held in the upper enclosure chamber. At station F the second felt is applied to the core as previously described and the ball is transferred back to the upper chamber. At station G the vacuum is released and the sealed cover removed. At station H the ball which had been covered in the previous cycle and held in cavity 3 throughout the previous seven stations is ejected from cavity 3. While the head rotates between station H and stage J, the loading plate rotates a further 120° to bring the cavity 1 back to the loading position. The ball that has just been covered is then transferred from the upper enclosure member to cavity 3 and will be carried round the whole cycle until it reaches station H and will then be ejected. The head then indexes through a further 40° to complete 360° rotation to bring the cell back to stage A where a further core is positioned in cavity 1, thereby completing the cycle.

It will be seen that the loading of the core and felts takes place at stations A, B, and C and that the vacuum is applied between stations D and G and that ejections of the completed ball takes place at station H on the second circuit.

As shown in FIG. 22 two magazines 220 and 221 of felts stacked in a vertical pile may be positioned over station B and station C respectively, and may be arranged to apply a felt to the loading plate when required. A ball core hopper 223 may be positioned over station A and may be arranged to present a core to the respective cavity in the loading plate when required. An automatic ejection system (not shown) may also be provided at station H so that once the machine has been loaded with cores and felts it can be switched on and will automatically cover the ball cores and eject them thereby totally removing labor dependence from the covering operation.

Alternatively, an operator may be positioned to load the ball cores and check that the felts are being correctly applied to the loading plates.

In order to obtain uniformity in finished ball sizes, it is important that the ball core, when subjected to vacuum is expanded to a uniform diameter and that the core or core plus felts is not deformed when engaged by the push rods of the assembly.

Because of the variations in wall thickness of ball cores and the differing pressure therein, there is a danger that when a predetermined vacuum is applied to the core the balls will expand to differing diameters thereby causing misfitting of the felts. In order to overcome this problem, it is proposed to provide four sensors (not shown) in the cavity in which the ball core is located, and spaced equally around the circumference of the ball so that when the vacuum is applied and the ball expands, the outer surface of the ball will engage the sensors and a signal will be passed from the sensors to the vacuum pump or a bleed valve to ensure that the level of vacuum is adjusted so that the ball expands to a predetermined diameter. The provision of these sensors allows for any variations in wall thickness and differences of internal pressure of the ball cores.

There is also a danger that when the upper and lower push rods engage the surface of the ball that they will deform the ball, again causing misfitting of the felts. To overcome this problem, it is proposed to provide overload sensors (not shown) at diametrically opposed positions on the side of the ball core so that when the push rods engage the opposite sides of the ball core the degree of ball deformation is limited by the sensors passing a signal back to the push rod actuators to limit the load applied to the ball.

With the above two sensing devices it is hoped that the felts may be applied to ball cores to produce a finished ball which possesses the required quality control standard thereby reducing the number of reject balls.

As previously described in order to cover the ball cores, each core is previously coated with an adhesive and is then expanded. The felts, coated with adhesive on one side, are subsequently applied to the expanded ball core to leave an oversize gap between each felt piece. Each felt covering piece has its periphery thickly coated with an adhesive so that when the vacuum is released, the gap between the felt pieces is diminished so that the adhesively coated edges of the cover pieces come into abutting contact with each other and are adhesively secured together.

It has been found that when the felts are stacked in a machine of the kind shown in FIG. 22, because of the thick coating of adhesive on the sides of each felt piece, it is difficult to separate a felt piece from the stack. It has been proposed therefore that the ball core should be coated with a thick layer of adhesive and the amount of adhesive on the edge of the felt pieces should be reduced so that after the felts have been applied to the expanded core and the vacuum is reduced and the balls passed to a curing chamber, curing of the ball core causes the adhesive between the felt pieces and the core to flow into the groove defined between the felt pieces, and as this groove is reduced the edges come into abutting contact with the adhesive there between. It is hoped that by reducing the amount of adhesive on the edges of the felts that they can be easily stacked in a machine of the kind shown in FIG. 22 and that problems of separating a single felt from the stack can be overcome.

Figure 28:
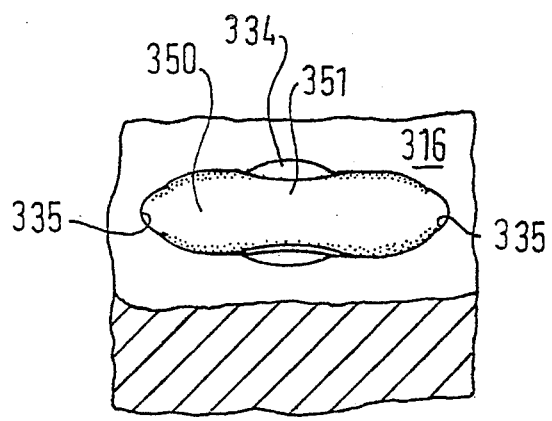
FIG. 28 is a plan view of a loading plate template in which a felt cover piece is to be located to be stretched by the apparatus of FIGS. 23 to 27.

The further embodiment of the present invention in which the felt cover pieces are first stretched is shown in FIGS. 23 to 27 where the stretching means comprising a plate 310 formed with four rectangular recesses 311 in which members 312 are respectively movable. Four segments 313 are bolted on top of the plate 310 and have flanges 314 which overlie the members 312 and define with the plate 310 cruciform guidance channels in which the members 312 are guided for movement in perpendicularly related directions. Above the segments 313 is a support plate 315 whereby the apparatus can be mounted on means (not shown) whereby it is bodily movable up and down to advance it toward or retract it away from a template 316 (FIG. 28).

Bolted on top of the plate 315 is an annular housing 316 having spaced-apart bearings 317 for a sleeve 318 which is integral at its upper end with a handle 319 and at its lower end with a flanged bush 320 so that by moving the handle 319 the sleeve 318 and bush 320 are rotatable relative to the housing 316 and the plate 310 and segments 313. The bush 320 has a flange 321 to which four links 322 are pivotally connected at equally angularly spaced positions while the other end of each link 322 is pivotally connected to a respective one of the members 312. It will thus be apparent that by rotation of the handle 319 the members 312 are jointly extended or retracted relative to the plate 310.

The plate 310 has four straight rows of pointed projections 323 each spaced inwardly from and parallel with the rear end of one of the recesses 311, while each member 312 has an arcuate array of similar pointed projections 324.

Beneath the plate 310 is a stripper plate 325. This is maintained parallel with the plate 310 by enlarged portions 326 of four bolts 327 integral with the stripper plate 325 and upstanding therefrom and each extending through a relatively large bore 328 in a respective one of the segments 313 and a relatively smaller bore 329 in the housing 316. Nuts 330 threaded onto the bolts 327 limit the displacement of the stripper plate 325 away from the plate 310 by compression springs 331 trapped in the bores 328 between the enlarged portion 326 of the bolts and the housing 316. The nuts 330 are positioned so that in the normal position of the stripper plate 325 spaced from the plate 310 all of the pointed projections 323 and 324 are retracted, the projections 323 of plate 310 within an elongate slot 332 for each row and each projection 324 within a respective slot 333 in the stripper plate, the length of each slot 333 in the direction of permitted movement of the associated member 312 being equal to the possible displacement of said member 312 in the channel 311 thereof when the handle 319 is rotated.

The apparatus of FIGS. 23 to 27 is intended for use in association with the apparatus generally as described above, i.e., the apparatus in which felt cover pieces cut generally to a Cassinian shape are placed flat in respective slots therefore in a loading plate and are transported by the loading plate to stations where a ball core is passed through the loading plate perpendicularly to the plane of the slots to carry the cover pieces with it into generally spherical enclosures whereby the cover pieces are wrapped around and adhesively secured to the core. In FIG. 28 there is shown one slot 334 in a loading plate 316 but it will be appreciated that to wrap two Cassinian cover pieces around the same core it is necessary to present them to the core in perpendicular relation. For this purpose two slots are provided in the same loading plate in relative positions such that the axes of the slots are perpendicularly related when the slots are positioned for movement therethrough of the same core. It is therefore convenient that the same stretching means should be capable of engaging and stretching cover pieces presented to it in perpendicularly related positions and it is for this purpose that the apparatus illustrated has four separable members 312 instead of only two although it is to be appreciated that only two of the members 312 moving on the same axis engage a cover piece in a given stretching operation.

It will also be apparent that the stretching means of FIGS. 23 to 27 does not lend itself to incorporation in the apparatus illustrated in FIGS. 1–22 without modification. The loading plate 316 of FIG. 28 can be a template separate from the slots of the loading plates of the apparatus in FIGS. 1 to 22 but this is not the optimum arrangement since each felt after stretching would have to be transferred from the slot of the template of FIG. 28 to one of the slots of the loading plate of the apparatus of FIGS. 1 to 22. Any such transfer stage is undesirable not only for economic reasons but because the time elapsing between stretching the felt in the slot 334 and its application to the ball core should be kept to a minimum to avoid any tendency of the stretched felt to resume its prestretched shape.

It is therefore preferred that the template 316 of FIG. 28 is the loading plate used in the apparatus resembling that of the apparatus of FIGS. 1 to 22 so that the slot 334 is a slot through which the ball core is subsequently passed into a part spherical enclosure to wrap the stretched felt around and adhere it to the ball core. After peeling it off the stack of simultaneously cut cover pieces an individual cover piece is placed in the slot 334 of FIG. 28 and is passed on the loading plate below the stretching means of FIGS. 23 to 27 and thence directly and without removal from the slot 334 to the station between the two enclosures illustrated in the apparatus of FIGS. 1 to 22. This can be achieved by enlargement of the rotary loading plate of the apparatus of FIGS. 1 to 22 or the rotary loading plate can be replaced by a linear arrangement on which individual loading plates each formed with two perpendicularly related slots 334 are transported on a conveyor in sequence to the stretching means of FIGS. 23 to 27 and thence to an apparatus similar to that illustrated in the apparatus of FIGS. 1 to 22.

Figure 23:
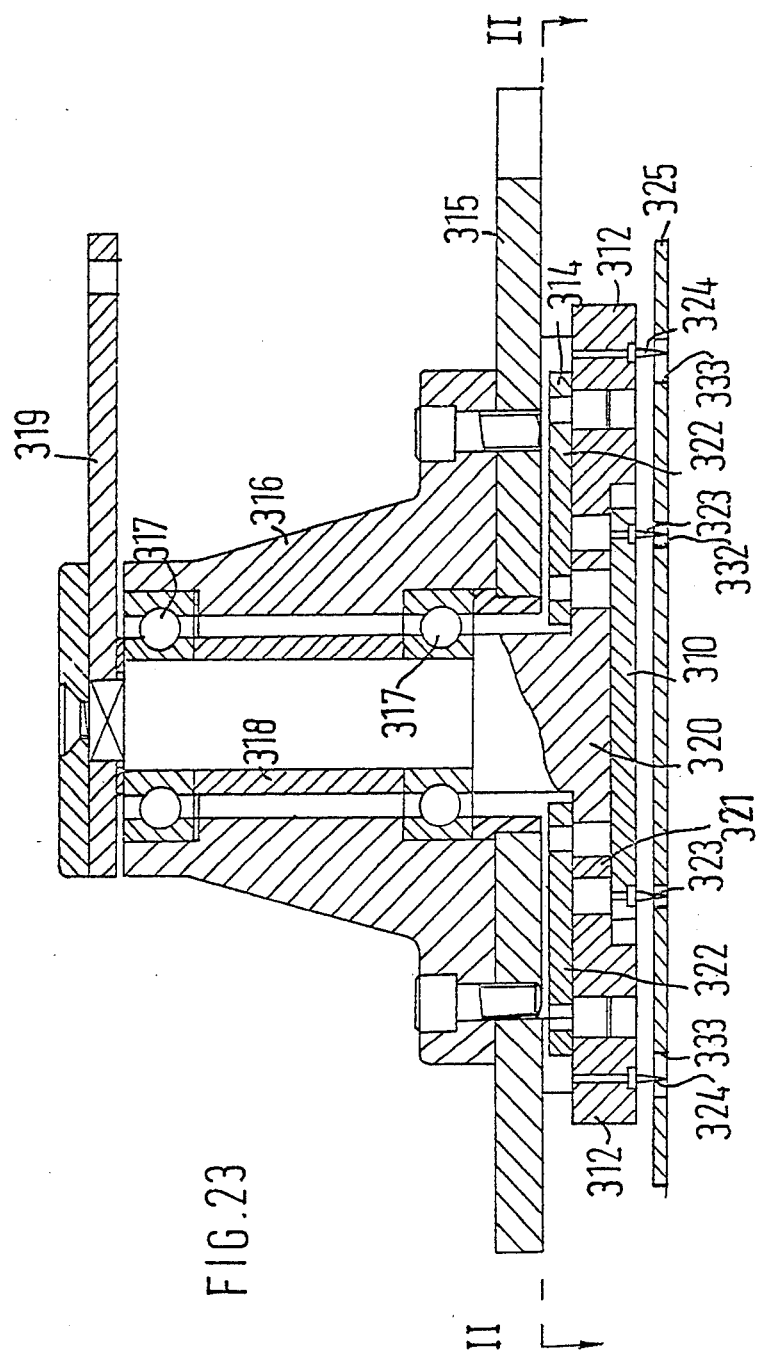
FIG. 23 is a sectional elevation of stretching means in accordance with the present invention taken on the line I—I of FIG. 24.
Figure 24:
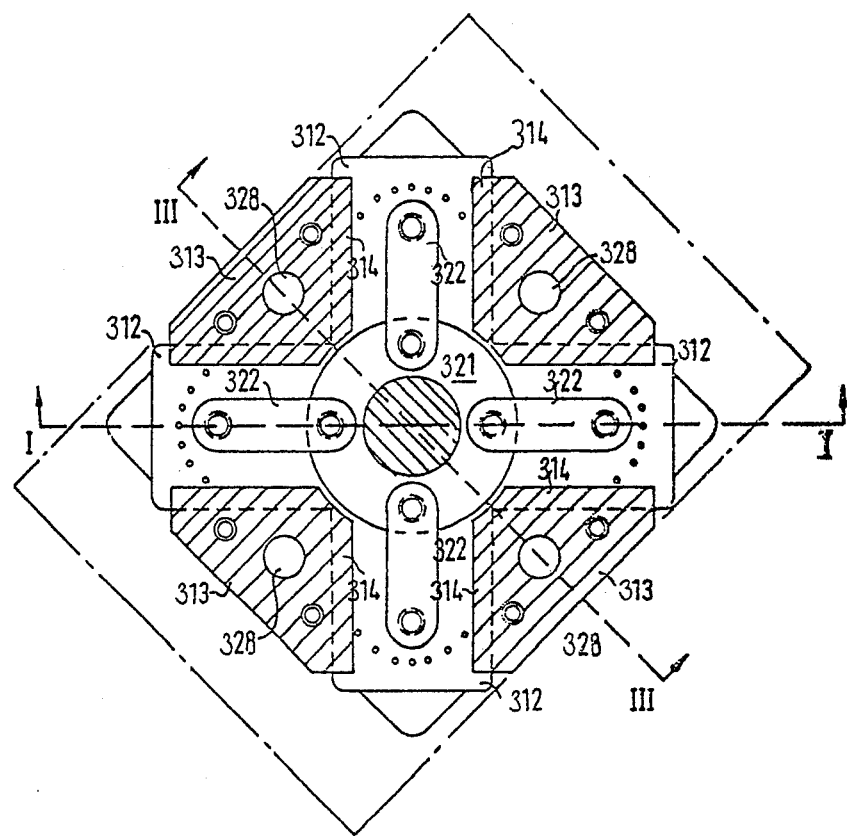
FIG. 24 is a sectional plan view taken on the lines II—II of FIG. 23.
Figure 25:
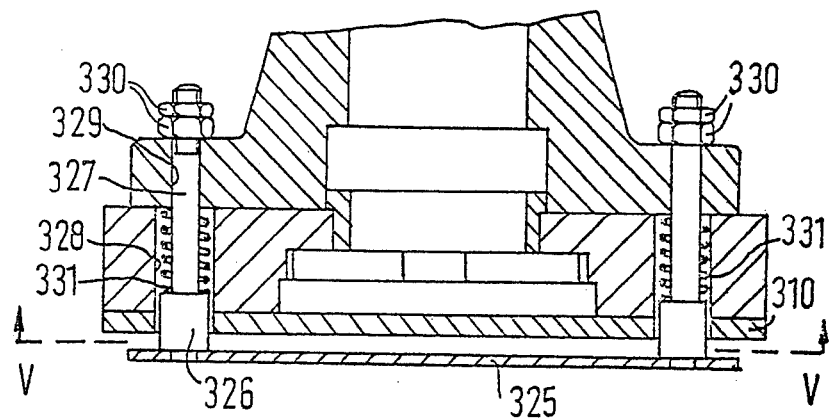
FIG. 25 is a sectional elevation with parts removed taken on the line III—III of FIG. 24.
Figure 26:
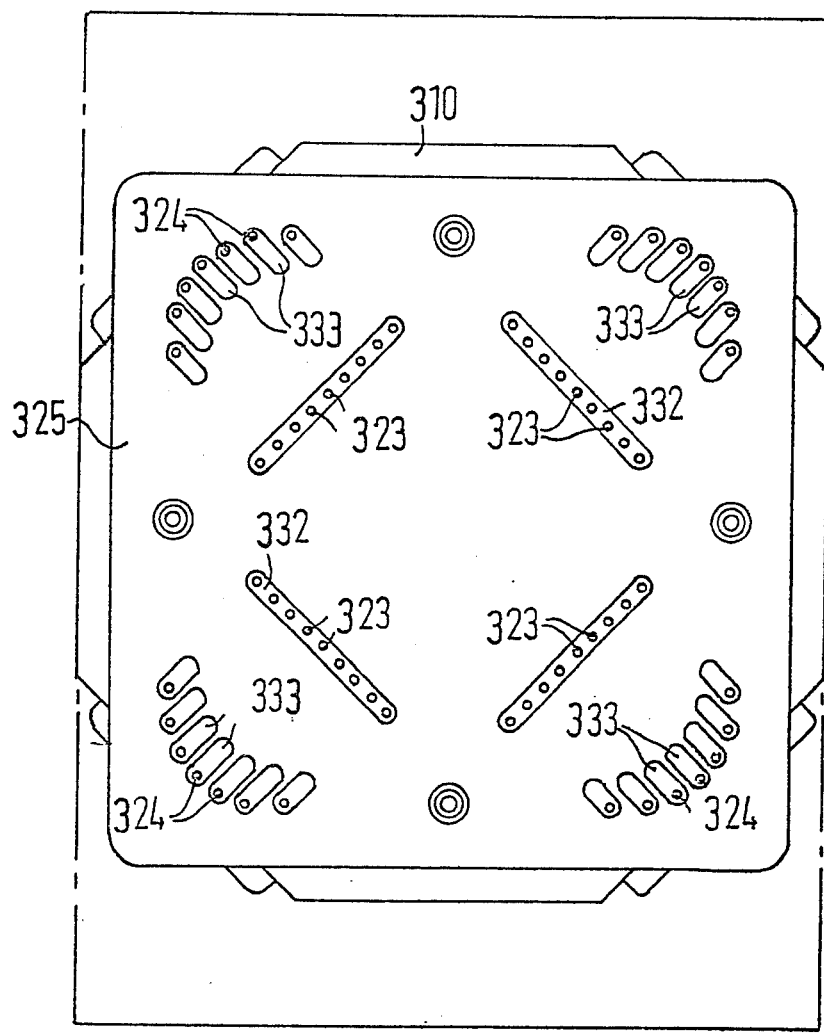
FIG. 26 is a view from below of the stretching means.
Figure 27:
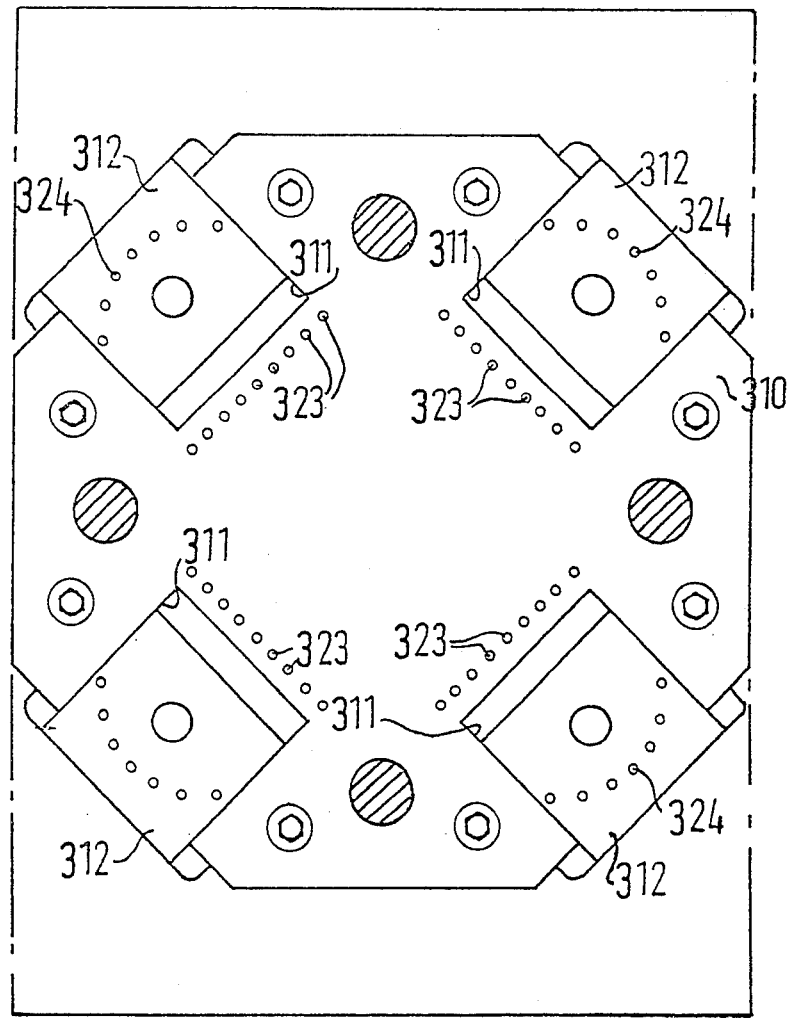
FIG. 27 is a view from below of the stretching means with the stripper plate removed taken on the line V—V of FIG. 25.

The operation of the apparatus illustrated in FIGS. 23 to 27 is as follows:

A number of cover pieces are cut from superimposed layers of felt, each having adhesive on one side, in a single stamping operation and adhesive is applied to the sides of the stack so that the peripheral edge of each cover piece is coated with adhesive. The cover pieces are then peeled off individually and each is placed in a respective slot 334 in a loading plate 316. The two cover pieces which are to be applied to the same ball core are located in similar slots 334 with their adhesive covered sides oppositely presented and the two slots are arranged in the same loading plate 316 so that when presented in sequence to the apparatus similar to that illustrated in our said co-pending application the axes of the slots are perpendicularly related. It will normally be convenient for the slots to be perpendicularly related when presented to the stretching means of FIGS. 23 to 27. On this assumption a first slot 334 arrives beneath the stretching means of FIGS. 23 to 27 with its axis parallel with the common direction of movement of two of the members 312. The stretching means of FIGS. 23 to 27 is then lowered until the stripper plate 325 rests on the loading plate 316. Continued downward movement of the stretching means will cause compression of the springs 331 so that the pointed projections 323 and 324 extend through the slots 332 and 333 of the stripper plate. Two of the parallel rows of stationary projections 323 will engage the felt cover piece in the slot 334 at the opposite ends of its central or waist portion while the movable projections 324 engage the end portions of the cover piece. At this time it is assumed that the two members 312 are in the inwardly retracted position relative to the plate 310. The handle 319 is now turned causing all of the members 312 to be extended relative to the plate 310 so that the projections 324 engaging the end portions of the felt move to the outermost position in which they are illustrated in FIGS. 23, 26, and 27. In so doing the movable projections 324 stretch the felt in the slot 334 and it will be appreciated that the felt is subjected to substantially wholly to longitudinal forces. Furthermore, the stationary projections 323 substantially prevent the application of any stretching forces to the central or waist portion of the cover piece.

Each cover piece is cut slightly undersize relative to the slot 334 into which it is placed but the central or waist portion of the cover piece is cut generally to the final shape, the reduction in size of the cover piece being primarily in the longitudinal direction.

Because of the tendency of each cover piece when wrapped around the spherical core to become squared off at its extreme ends the slot 334 is, as shown, provided with end recesses 335 of a smaller radius of curvature than the remainder of the slot. Squaring off the ends of the cover piece when wrapped around the ball core will result in the cover piece regaining a true Cassinian shape so as to make proper fitting contact with the other cover piece wrapped on the same core.

The result of the stretching operation is that each cover piece has a precisely predetermined shape imparted to it by the shape of the slot 334 immediately prior to application to the ball core.

What is claimed is:

1. A method of applying two cover pieces at right angles to one another around the surface of a resilient ball core, the method comprising placing cut-to-shape cover pieces flat in respective slots therefor in a planar loading plate, the slots having end portions which are generally of the shape of the cut cover pieces, moving the loading plate until a first of said slots lies in a position intermediate two enclosures on opposite sides of the loading plate, displacing said core from a position in the loading plate adjacent said first slot through said first slot into a first of said enclosures so that the cover piece in said first slot is carried with the core into said first enclosure and wrapped around the core, moving the loading plate until the second of said slots lies in said intermediate position between the enclosures and displacing the core from the first into the second of said enclosures through the second slot such that the cover piece in said second slot is wrapped around the core in perpendicular relation to the cover piece already wrapped thereon.

2. A method as claimed in claim 1, wherein the core is initially positioned in a first throughway in the loading plate in register with said first slot such that the core is supported by location means in said first throughway to lie within the loading plate, a first of said cover pieces is located in said first slot to overlie the core with an adhesive-coated surface of said cover piece presented to the core, a second of said cover pieces is located in said second slot with an adhesive-coated surface of said second cover piece presented oppositely to that of said first cover piece, said second slot being in register with a second throughway in the loading plate which is of greater diameter than the core throughout its length, and the loading plate is moved to bring said first and second slots and associated throughways in succession to said position intermediate the enclosures, the core being displaced from the first throughway into the first enclosure when in register therewith to carry said first cover piece into the first enclosure and wrap it around and adhere it to the core, thereafter the loading plate being moved to bring said second slot, throughway, and cover piece to said intermediate position while the core remains in the first enclosure, and then displacing the core with said first cover piece adhered thereto from the first enclosure through the second slot and throughway into the second enclosure to wrap the second cover piece around the core at right angles to the first piece and adhere the second cover piece to the core.

3. A method as claimed in claim 1, wherein consolidating members are moved inwardly of each enclosure behind the core when the latter has entered the enclosure to press the ends of the cover piece carried by the core into said enclosure into contact with the core, the consolidating members of the first enclosure serving to retain the core with the first core piece adhered thereto in the first enclosure during movement of the loading plate to bring the second slot to said intermediate position.

4. A method as claimed in claim 1, wherein the cover pieces are cut undersize relative to the slots in which they are to be located and wherein each cover piece after location in the respective slot is stretched to fill the slot, thereby assuming a shape dictated by the slot, and adhesively secured to the core while it retains the shape of the slot.

* * * * *